United States Patent
Tsui

(10) Patent No.: US 8,050,720 B2
(45) Date of Patent: Nov. 1, 2011

(54) SPEED DIALING METHOD FOR DISPLAYING CONTACT INFORMATION AND MOBILE COMMUNICATION DEVICE USING THE SAME

(75) Inventor: Yuan-Mao Tsui, Taoyuan (TW)

(73) Assignee: HTC Corporation, Taoyuan (TW)

( * ) Notice: Subject to any disclaimer, the term of this patent is extended or adjusted under 35 U.S.C. 154(b) by 505 days.

(21) Appl. No.: 12/205,561

(22) Filed: Sep. 5, 2008

(65) Prior Publication Data

US 2009/0111435 A1     Apr. 30, 2009

(30) Foreign Application Priority Data

Oct. 29, 2007    (TW) ............................... 96140568 A

(51) Int. Cl.
*H04M 1/00*    (2006.01)
*H04B 1/38*    (2006.01)
*H04M 9/00*    (2006.01)
*H04W 68/00*    (2009.01)

(52) U.S. Cl. ........ 455/564; 455/401; 455/460; 455/565; 340/100.14

(58) Field of Classification Search .................. 455/564, 455/401, 460, 565; 340/100.14
See application file for complete search history.

(56) References Cited

U.S. PATENT DOCUMENTS
2004/0204123 A1*  10/2004  Cowsky et al. ............... 455/565

OTHER PUBLICATIONS

Macromedia Flash, alpha transparent, Macromedia, 3 pages.*
Seeting Alpha (Transparency) in Flash (hereinafter alpha), Lashf.com, 3 pages.*
Adobe Flash year 2000, 2002 or 2003, Wikipedia, 16 pages.*

* cited by examiner

*Primary Examiner* — Nick Corsaro
*Assistant Examiner* — Munsoon Choo
(74) *Attorney, Agent, or Firm* — Birch, Stewart, Kolasch & Birch, LLP

(57) ABSTRACT

A speed dialing method for displaying contact information for use in a mobile communication device is disclosed. Plural time threshold values and information display transparencies corresponding to the time threshold values, respectively, are defined. When the mobile communication device receives a trigger signal generated by pressing a button and a time for continuously receiving the trigger signal respectively reaches the time threshold values, contact information corresponding to the pressed button is displayed with information display transparencies corresponding to the time threshold values on a screen of the mobile communication device. When the time for continuously receiving the trigger signal reaches a dial threshold value, a contact phone number assigned to the pressed button is dialed by the mobile communication device.

19 Claims, 4 Drawing Sheets

```
┌─────────────────────────────────────┐
│ Plural time threshold values and    │
│ information display transparencies  │
│ corresponding to the time threshold │
│ values, respectively, are defined   │──── S21
│ for a mobile communication device   │
│ and stored in a memory of the mobile│
│ communication device.               │
└─────────────────────────────────────┘
                   │
                   ▼
┌─────────────────────────────────────┐
│ When the mobile communication device│
│ receives a trigger signal generated │
│ by pressing a button and a time for │
│ continuously receiving the trigger  │
│ signal reaches the time threshold   │
│ value, contact information          │──── S22
│ corresponding to the pressed button │
│ is displayed with the information   │
│ display transparency corresponding  │
│ to the reached time threshold value │
│ on a screen of the mobile           │
│ communication device communication  │
│ device                              │
└─────────────────────────────────────┘
                   │
                   ▼
┌─────────────────────────────────────┐
│ When the time for continuously      │
│ receiving the trigger signal reaches│
│ a dial threshold value (the tenth   │
│ time threshold value), a contact    │
│ phone number assigned to the pressed│──── S23
│ button is dialed by the mobile      │
│ communication device for            │
│ communicating with the desired      │
│ person of the contact phone number. │
└─────────────────────────────────────┘
```

FIG. 2

SPEED DIALING METHOD FOR DISPLAYING CONTACT INFORMATION AND MOBILE COMMUNICATION DEVICE USING THE SAME

CROSS REFERENCE TO RELATED APPLICATIONS

This Application claims priority of Taiwan Patent Application No. 96140568, filed on Oct. 29, 2007, the entirety of which is incorporated by reference herein.

BACKGROUND OF THE INVENTION

1. Field of the Invention

The invention relates to speed dialing (or abbreviated dialing) in a mobile communication device, and in particular, to a speed dialing method for displaying contact information and a mobile communication device using the method.

2. Description of the Related Art

"Speed Dial" (or Abbreviated Dial) enables users to store frequently used phone number on each button of a keypad of a mobile communication device. Usually, the user may store totally ten phone numbers for buttons 0 to 10 of the keypad. When the phone numbers have been stored for a button, the user may press the button (a speed dial button) for a period of time to dial the phone number assigned to the pressed button, allowing for time savings and convenience.

However, when a speed dial number was just assigned to a button lately or if some speed dial buttons are not frequently used, users may probably forget which phone numbers are assigned to which speed dial buttons. Thus, the invention provides a speed dialing method for displaying contact information.

BRIEF SUMMARY OF THE INVENTION

The invention provides speed dialing methods. An exemplary embodiment of a speed dialing method for displaying contact information for use in a mobile communication device comprises the following steps: plural time threshold values and information display transparencies corresponding to the time threshold values, respectively, are defined; when the mobile communication device receives a trigger signal generated by pressing a button and the time for continuously receiving the trigger signal respectively reaches the time threshold value, contact information corresponding to the pressed button is displayed with the information display transparency corresponding to the reached time threshold value on a screen of the mobile communication device; and when the time for continuously receiving the trigger signal reaches a dial threshold value, the contact phone number assigned to the pressed button is dialed by the mobile communication device.

The invention further provides mobile communication devices. An exemplary embodiment of a mobile communication device comprises a screen, a dialing module, a memory, a signal receiving module, and a microcontroller. The dialing module comprises a keypad providing plural buttons. The memory stores plural time threshold values and information display transparencies corresponding to the time threshold values, respectively, defined for the mobile communication device. The signal receiving module receives trigger signals generated by pressing the buttons of the keypad. The microcontroller receives the trigger signal via the signal receiving module. Wherein, when the time for continuously receiving the trigger signal respectively reaches the time threshold value, the microcontroller displays contact information corresponding to the pressed button with the information display transparency corresponding to the reached time threshold value on the screen, and when the time for continuously receiving the trigger signal reaches a dial threshold value, the microcontroller dials a contact phone number corresponding to the pressed button.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2 is a flowchart of a speed dialing method for displaying contact information of the present invention.

DETAILED DESCRIPTION OF THE INVENTION

Figure 1A:
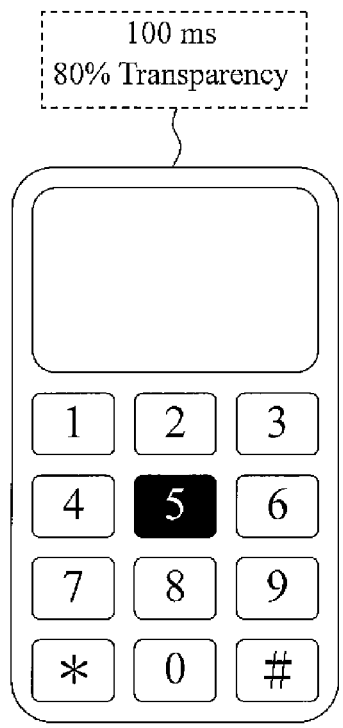
FIG. 1A~1C are schematic views of contact information display of the present invention.

Several exemplary embodiments of the invention are described with reference to FIGS. 1A through 3, which generally relate to speed dialing for a mobile phone. It is to be understood that the following disclosure provides various different embodiments as examples for implementing different features of the invention. Specific examples of components and arrangements are described in the following to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a speed dialing method for displaying contact information and a mobile communication device using the method.

In an embodiment of the speed dialing method of the present invention, contact information assigned to a button is displayed on a screen of a mobile communication device when the button is pressed, and the contact information is displayed with fade-in display effect. The contact information includes, for example, but not limit to, a name, a phone number, a picture, an e-mail, and so forth. The button includes, for example, but not limit to, a physical button disposed on the mobile communication device or a virtual button displayed on the screen of the mobile communication device, and the button is, for example, but not limit to, a number button. The screen may be a touch-sensitive screen including, for example, but not limit to, a resistive, capacitive, infrared, surface acoustic wave (SAW), and/or other types of touch screen. The mobile communication device includes, for example, but not limit to, a cellular phone, a personal digital assistant (PDA), a PDA phone, a smart phone, and so forth.

Figure 1B:
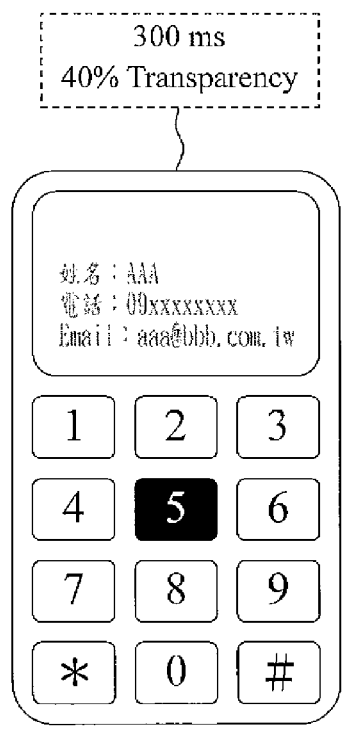
Figure 1C:
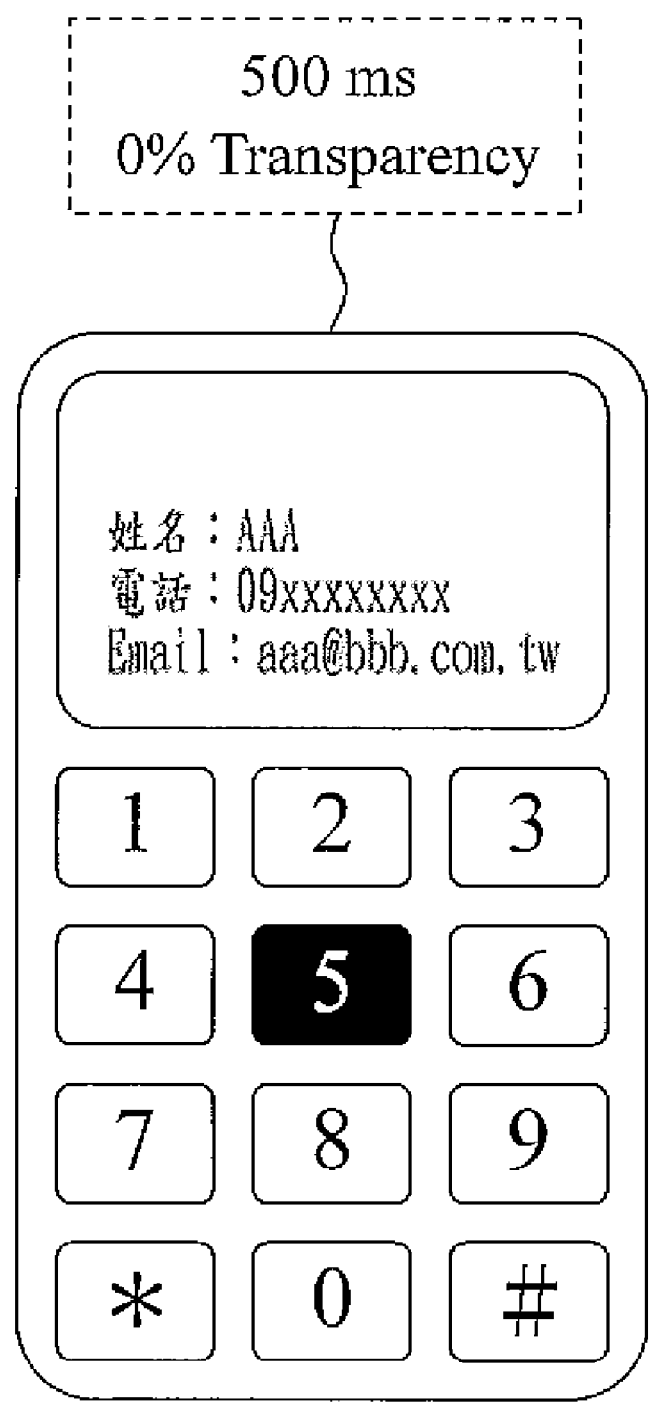

As shown in FIG. 1A, for example, when a button "5" of a mobile communication device is continuously pressed for 100 milliseconds (ms), contact information assigned to the pressed button "5" is displayed with 80% information display transparency. When a button "5" is continuously pressed for 300 ms, the contact information assigned to the pressed button "5" is displayed with 40% information display transparency, as shown in FIG. 1B. When a button "5" is continuously pressed for 500 ms, the contact information assigned to the pressed button "5" is displayed with 0% information display transparency, as shown in FIG. 1C, and a contact phone number relating to the contact information is dialed by the mobile communication device for communicating with desired person of the contact phone number.

As described, when a button of a mobile communication device is pressed, contact information corresponding to the pressed button gradually appears with information display transparency from 100% to 0%, and when the time for continuously pressing the button reaches a predefined dial threshold value (1 second, for example), a contact phone number assigned to the pressed button is dialed by the mobile communication device for communicating with the desired person of the contact phone number. Accordingly, when the pressed button is pressed and the contact phone number assigned to the pressed button has not been dialed yet, the contact information assigned to the pressed button can be recognized. However, if the user merely wants to input the number of the button to dial a phone number rather than communicate with the person of the contact information assigned to the pressed button, the user can stop pressing the button before the time for continuously pressing the button reaches the predefined dial threshold value (1 second, for example), and the number on the pressed button can be input and displayed on the screen. In one embodiment, the number of the pressed button is inputted once the button is pressed. In another one embodiment, the number of the pressed button is inputted once the pressed button is released. If the user wants to communicate with the person of the contact information assigned to the pressed button, the user has to press the button continuously for a period of time reaching the predefined dial threshold value to dial the contact phone number.

In some embodiments, the contact information display can be implemented by object transparency methods such as alpha blending, texture mapping, and the like.

FIG. 2 is a flowchart of a speed dialing method for displaying contact information of the present invention.

First, plural time threshold values and information display transparencies corresponding to the time threshold values, respectively, are defined for a mobile communication device (step S21) and stored in a memory of the mobile communication device. In this embodiment, for example, but not limit to, ten time threshold values, which represent ten different continuous pressing time, respectively, for the buttons, are defined. More than ten time threshold values or less than ten time threshold values can be defined. Further, information display transparencies are assigned to each time threshold value to provide a fade-in effect for the contact information display, so that the user can recognize when the mobile communication device will dial the phone number assigned to the pressed button.

When the mobile communication device receives a trigger signal generated by pressing a button and a time for continuously receiving the trigger signal reaches the time threshold value, contact information corresponding to the pressed button is displayed with the information display transparency corresponding to the reached time threshold value on a screen of the mobile communication device (step S22). Originally the information display transparency for the contact information is 100%; for example, when a button is continuously pressed for 100 ms (the first time threshold value), contact information assigned to the pressed button is displayed with 90% information display transparency (not shown); when a button is continuously pressed for 200 ms (the second time threshold value), contact information assigned to the pressed button is displayed with 80% information display transparency (FIG. 1A); and when a button is continuously pressed for 300 ms, 400 ms, 500 ms, 600 ms, 700 ms, 800 ms, and 900 ms (the third, fourth, fifth, sixth, seventh, eighth, and ninth time threshold value, respectively), contact information assigned to the pressed button is displayed with 70%, 60%, 50%, 40%, 30%, 20%, and 10% information display transparency, respectively. In some preferred embodiments, the greater time threshold values among the time threshold values correspond to the less information display transparencies among the information display transparencies.

When the time for continuously receiving the trigger signal reaches a dial threshold value (the tenth time threshold value), a contact phone number assigned to the pressed button is dialed by the mobile communication device for communicating with the desired person of the contact phone number (step S23). When the pressed button is continuously pressed for 1000 ms (the tenth time threshold value, defined as a dial threshold value), for example, contact information assigned to the pressed button is displayed with 0% information display transparency, the contact phone number assigned to the pressed button is dialed by the mobile communication device for communicating with desired person of the contact phone number.

Figure 3:
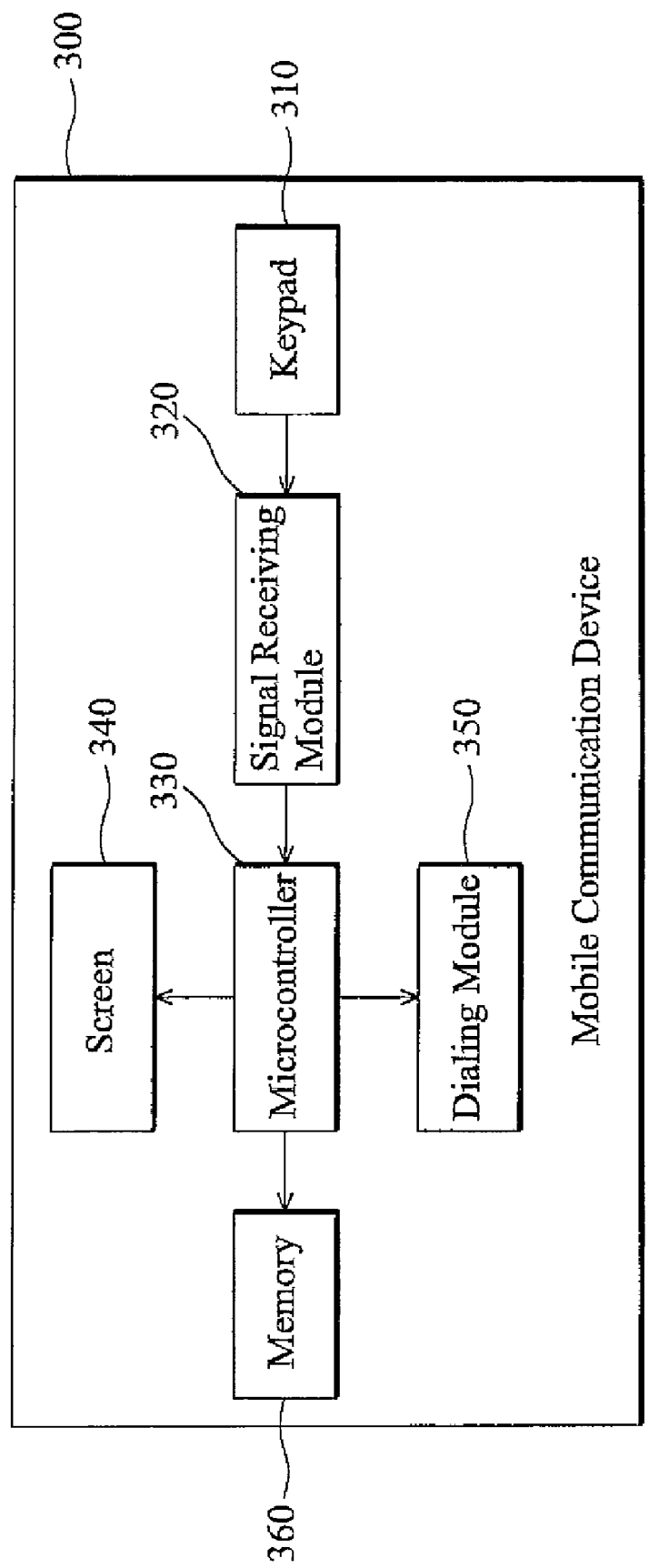
FIG. 3 is a schematic view of a mobile communication device of the present invention.

FIG. 3 is a schematic view of a mobile communication device of the present invention.

Mobile communication device 300 comprises a keypad 310, a signal receiving module 320, a microcontroller 330, a screen 340, a dialing module 350, and a memory 360. Memory 360 stores plural time threshold values and information display transparencies corresponding to the time threshold values, respectively, defined for mobile communication device 300. Dialing module comprises a keypad 310 providing plural buttons, keypad 310 includes, for example, but not limit to, a physical keypad disposed on the mobile communication device 300 or a virtual keypad displayed on screen 340 of mobile communication device 300. Signal receiving module 320 receives a trigger signal generated by pressing the buttons of keypad 310. Microcontroller 330 receives the trigger signal via signal receiving module 320, and when the time for continuously receiving the trigger signal respectively reaches the time threshold values, microcontroller 330 displays contact information corresponding to the pressed button with fade-in effect based on the information display transparencies corresponding to the time threshold values defined and stored in memory 360 on the screen. When the time for continuously receiving the trigger signal reaches a dial threshold value, microcontroller 330 dials a contact phone number assigned to the pressed button.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speed dialing method for displaying contact information, for use in a mobile communication device, comprising:
   defining plural time threshold values and information display transparencies corresponding to the time threshold values, respectively;
   when the mobile communication device receives a trigger signal generated by pressing a button and a time for continuously receiving the trigger signal reaches the time threshold value, contact information corresponding to the pressed button is displayed with the information display transparency corresponding to the reached time threshold value on a screen of the mobile communication device, wherein the contact information comprises the name of the contact; and
   when the time for continuously receiving the trigger signal reaches a dial threshold value, a contact phone number corresponding to the pressed button is dialed by the mobile communication device.

2. The speed dialing method as claimed in claim 1, wherein the time threshold values comprises a first time threshold value and a second time threshold value, and when the time for continuously receiving the trigger signal reaches the first or second time threshold value, the contact information corresponding to the pressed button is displayed with first or second information display transparency, respectively, on the screen of the mobile communication device, where the first information display transparency is greater than the second information display transparency.

3. The speed dialing method as claimed in claim 1, wherein the greater time threshold values among the time threshold values correspond to the less information display transparencies among the information display transparencies.

4. The speed dialing method as claimed in claim 1, wherein when the time for continuously receiving the trigger signal reaches the dial threshold value, the contact information corresponding to the pressed button is displayed with 0% information display transparency on the screen of the mobile communication device.

5. The speed dialing method as claimed in claim 1, wherein the button is a number button.

6. The speed dialing method as claimed in claim 5, further comprising the step: when the time for continuously receiving the trigger signal does not reach the dial threshold value, a number corresponding to the pressed number button is inputted.

7. The speed dialing method as claimed in claim 5, further comprising the step: when the time for continuously receiving the trigger signal does not reach the dial threshold value and the pressed button is released, a number corresponding to the pressed number button is inputted.

8. The speed dialing method as claimed in claim 1, wherein the button comprises a physical button disposed on the mobile communication device or a virtual button displayed on the screen of the mobile communication device.

9. The speed dialing method as claimed in claim 1, wherein the mobile communication device comprises a cellular phone, a personal digital assistant (PDA), a PDA phone, or a smart phone.

10. A mobile communication device, comprising:
a screen;
a dialing module, comprising a keypad providing plural buttons;
a memory, storing plural time threshold values and information display transparencies corresponding to the time threshold values, respectively;
a signal receiving module, receiving trigger signals generated by pressing the buttons of the keypad; and
a microcontroller, receiving a trigger signal via the signal receiving module, wherein when a time for continuously receiving the trigger signal reaches the time threshold value, the microcontroller displays contact information corresponding to the pressed button with the information display transparency corresponding to the reached time threshold value on the screen, wherein the contact information comprises the name of the contact, and when the time for continuously receiving the trigger signal reaches a dial threshold value, the microcontroller dials a contact phone number corresponding to the pressed button.

11. The mobile communication device as claimed in claim 10, wherein the time threshold values comprises a first time threshold value and a second time threshold value, and when the time for continuously receiving the trigger signal reaches the first or second time threshold value, the microcontroller displays the contact information corresponding to the pressed button with first or second information display transparency, respectively, on the screen, where the first information display transparency is greater than the second information display transparency.

12. The mobile communication device as claimed in claim 10, wherein the greater time threshold values among the time threshold values correspond to the less information display transparencies among the information display transparencies.

13. The mobile communication device as claimed in claim 10, wherein when the time for continuously receiving the trigger signal reaches the dial threshold value, the microcontroller displays the contact information corresponding to the pressed button with 0% information display transparency on the screen of the mobile communication device.

14. The mobile communication device as claimed in claim 10, wherein the button is a number button.

15. The mobile communication device as claimed in claim 14, wherein when the time for continuously receiving the trigger signal does not reach the dial threshold value, the microcontroller inputs a number corresponding to the pressed number button.

16. The mobile communication device as claimed in claim 14, wherein when the time for continuously receiving the trigger signal does not reach the dial threshold value and the pressed button is released, the microcontroller inputs a number corresponding to the pressed number button.

17. The mobile communication device as claimed in claim 10, wherein the keypad comprises a physical keypad disposed on the mobile communication device or a virtual keypad displayed on the screen of the mobile communication device.

18. The mobile communication device as claimed in claim 10, comprising a cellular phone, a PDA, a PDA phone, or a smart phone.

19. A non-transitory computer-readable medium comprising a computer program, which, when executed, causes a device to perform a method for speed dialing, wherein the method comprises:

defining plural time threshold values and information display transparencies corresponding to the time threshold values, respectively;

when the mobile communication device receives a trigger signal generated by pressing a button and a time for continuously receiving the trigger signal reaches the time threshold value, contact information corresponding to the pressed button is displayed with the information display transparency corresponding to the reached time threshold value on a screen of the mobile communication device, wherein the contact information comprises the name of the contact; and when the time for continuously receiving the trigger signal reaches a dial threshold value, a contact phone number corresponding to the pressed button is dialed by the mobile communication device.

* * * * *